United States Patent [19]
Johnson

[11] 4,036,384
[45] July 19, 1977

[54] TRUCK FOR TRANSPORT OF AIRPLANE BY ITS NOSE LANDING WHEEL

[76] Inventor: Philip L. Johnson, 705 Vesta St., Inglewood, Calif. 90302

[21] Appl. No.: 705,948

[22] Filed: July 16, 1976

[51] Int. Cl.$^2$ .............................................. B60B 29/00
[52] U.S. Cl. ................................ 214/334; 180/14 C; 187/8.52; 188/32
[58] Field of Search ................. 180/14 C, 14 A, 14 R, 180/19 R, 19 S; 214/330, 331, 332, 333, 334; 187/8.52, 97; 188/32

[56] References Cited

U.S. PATENT DOCUMENTS

| | | | |
|---|---|---|---|
| 2,254,564 | 9/1941 | Caslake | 214/334 |
| 2,573,728 | 11/1951 | Pugh, Sr. | 214/334 |
| 2,661,817 | 12/1953 | Mullins | 188/32 |
| 2,695,718 | 11/1954 | Epps | 180/14 C |
| 2,732,088 | 1/1956 | Arnot | 180/14 C |
| 3,049,253 | 8/1962 | Cabral | 180/14 R X |
| 3,077,247 | 2/1963 | West, et al. | 188/32 X |
| 3,825,869 | 7/1974 | Loomis | 214/331 |
| 3,946,886 | 3/1976 | Robinson | 214/334 |

Primary Examiner—Joseph F. Peters, Jr.
Assistant Examiner—Jack D. Rubenstein
Attorney, Agent, or Firm—Forrest J. Lilly

[57] ABSTRACT

The disclosure is of a wheeled truck or transport vehicle, adapted for elevating and supporting the nose wheel of an airplane, of the small or private class, and transporting it about the landing field. The truck has a horizontal nose roller, adapted to be rammed under the nose wheel of the airplane landing gear, and to thereby elevate the nose wheel. The advancing truck has, just behind the nose roller, a horizontally pivoted gate, initially swung down to act as a platform, and behind that a turntable. These ride under the nose wheel, one after the other, as the nose roller is thrust under the nose wheel of the airplane and then on beyond. The gate already mentioned is initially positioned in an approximately horizontal position, just in back of the nose cylinder of the truck, and is pivoted at the bottom on the normally front edge of the turntable. As the advancing turntable centers under the nose wheel, it engages a rearward gate, pivoted at or below its lower edge on the normally rearward edge of the turntable. When this rearward gate is engaged by the nose wheel of the airplane, it tilts back, and, through links, tilts the front gate up. At the end of this action, the nose wheel of the airplane is trapped on the turntable, between these gates, and an automatic locking device has become engaged. Means are provided for unlocking this device, whereupon the gates can drop, and the truck pulled out from under the nose wheel of the airplane.

6 Claims, 6 Drawing Figures

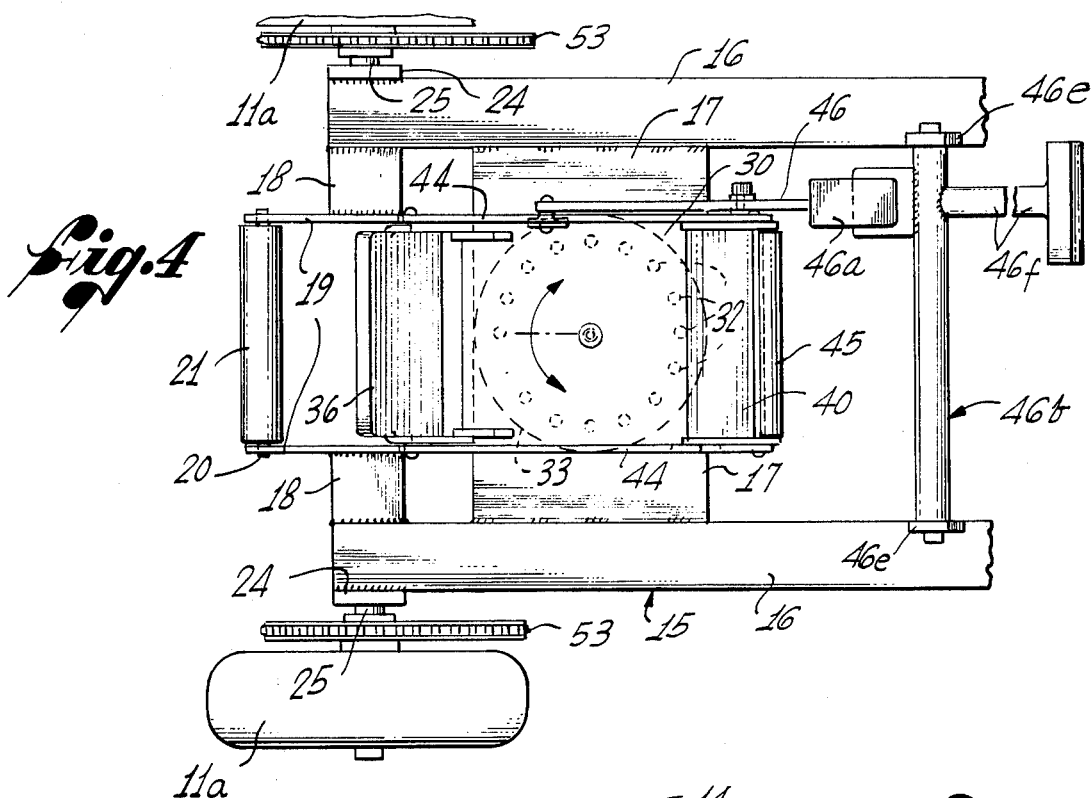
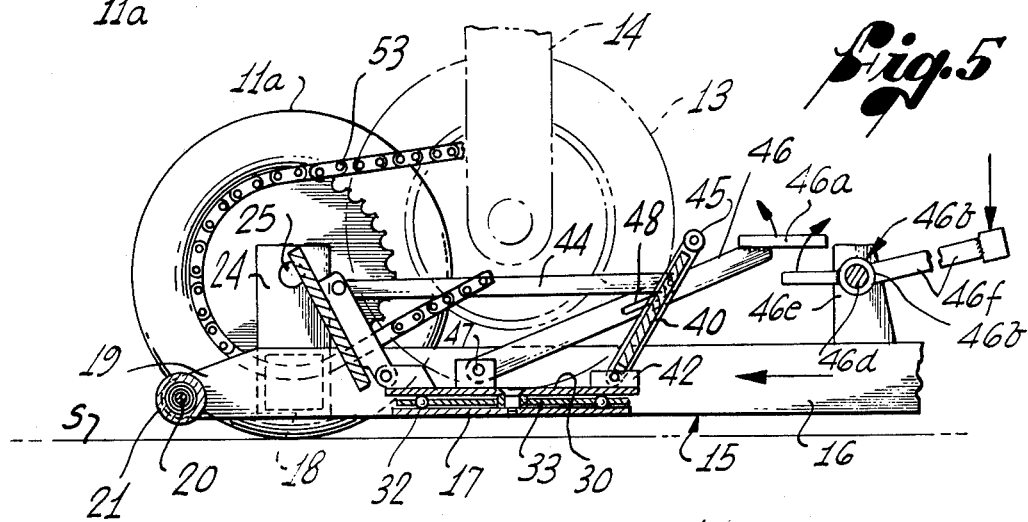
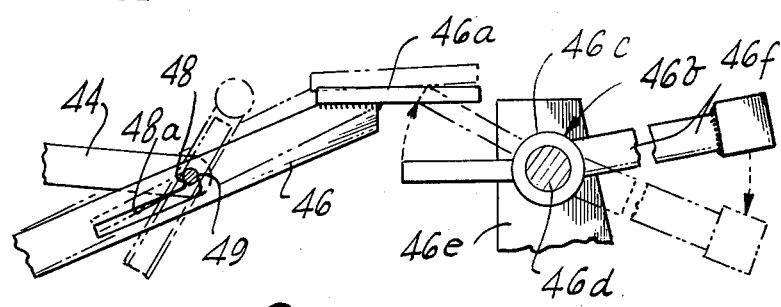

TRUCK FOR TRANSPORT OF AIRPLANE BY ITS NOSE LANDING WHEEL

This invention relates generally to airplane towing devices, and more particularly to a wheeled truck for elevating just above the runway, the nose wheel of the tricycle landing gear of a small airplane, to a secure transport position such that the airplane can be towed or otherwise readily maneuvered by the truck to or from a parking position, and by which the airplane can be moved along its longitudinal center line, and/or turned at any angle up to 90° from its longitudinal center line.

There is a present need in the art for such a transport truck, having the combined features of easy elevation of the nose wheel of the landing gear into a transport position, automatic trapping and locking of the nose wheel in the transport position as the latter is reached, and a mounting of the trapping and locking means for rotation of the latter on a vertical axis to facilitate pivotal action between the nose wheel of the airplane carriage and the transport truck to facilitate steering.

According to the invention, there is provided a wheeled truck, preferably employing two rubber tired front wheels, and a single caster wheel at the back. The truck is preferably powered, with its two front wheels chain-driven, but may be manually powered for light planes. The truck has a drop frame positioned close to the ground, and has a rotatable nose cylinder adapted to be thrust against and under the pneumatic rubber tired nose wheel of the airplane carriage slightly above the runway surface. On the frame is a "Lazy Susan", or turntable, on which the nose wheel rests when positioned on the truck. A front gate is pivoted on a horizontal transverse axis, just above the turntable, and this gate is movable between a forward level or slightly downwardly sloping position, in which its front edge is just in back of the aforementioned nose cylinder, and hence in a position to act as a platform which travels under the nose wheel of the airplane in supportive engagement therewith, as the nose cylinder of the advancing truck is thrust under and then past the nose wheel of the airplane. Thereby, the nose wheel rides (relatively) up or over the advancing gate and onto the oncoming turntable. As the turnable is approaching a centered position relative to the nose wheel, a pivoted rearward confinement gate thrusts against the nose wheel and is pushed back. Initially, this rearward gate, which is pivoted on a lower transverse horizontal axis on the frame, tilts somewhat forwardly. As it collides with the nose wheel, it tilts somewhat rearwardly. The front gate simultaneously tilts up, owing to a link connecting the two gates. The two gates automatically lock in this position, and the aircraft nose wheel is then in a sort of "pen", mounted atop the turntable. The truck may then be maneuvered to push the airplane forward or pull it backwards, or to the side, the turntable enabling the truck to turn to the side, while its wheel confinement pen and wheel hold their position. Or, of course, as will usually be the case, these movements can occur together, in any combination or sequence. Once the predetermined parking place for the airplane is reached, the airplane wheel can be taken off the truck by unlocking the pen, thereby releasing the gates to fall forward to the platform position of the front gate, and pulling or driving the truck from under the nose wheel of the airplane. Or, of course, the airplane may remain with its nose wheel jacked up on the truck during storage time, and not removed from the truck until the airplane has been transported thereby back onto the runway or other area.

In the Drawings, showing one illustrative embodiment thereof:

FIG. 4 is a plan view of the truck as seen in FIG. 3, the nose wheel of the aircraft, however, not being shown;

FIG. 5 is a view similar to FIG. 3, but with the nose wheel of the airplane having been elevated into transporting position, and the wheel trap or pen having been actuated; and FIG. 6 is a fragmentary side elevational view of a portion of the wheel trap, and release device.

Figure 1:
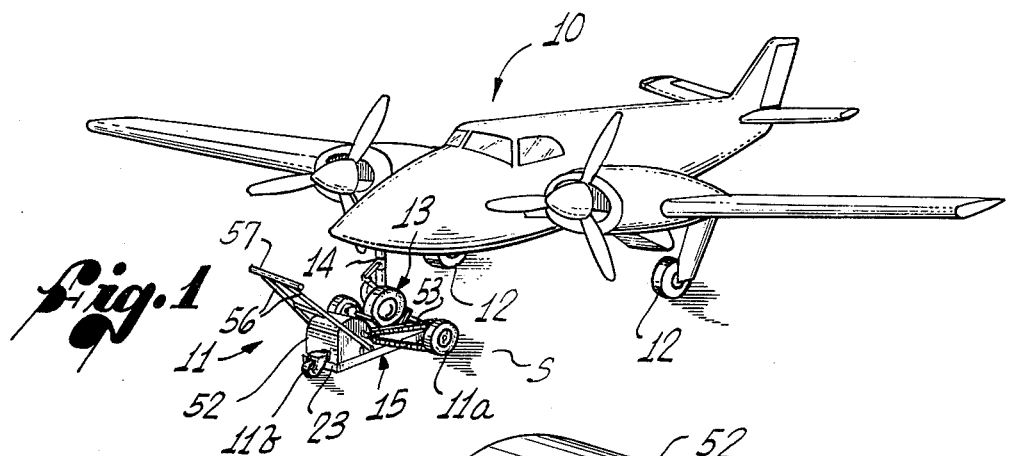
FIG. 1 is a perspective view of an airplane jacked up and supported in transport position by the transport truck of the invention.

With reference to the drawings, numeral 10 designates generally an airplane, shown in FIG. 1 as having been picked up by the truck 11 of the invention. The airplane has a tricycle type landing gear carriage arrangement, with two rearward wheels 12, and a pneumatic rubber tired nose wheel 13 at the front, at the lower end of a strut 14.

Figure 3:
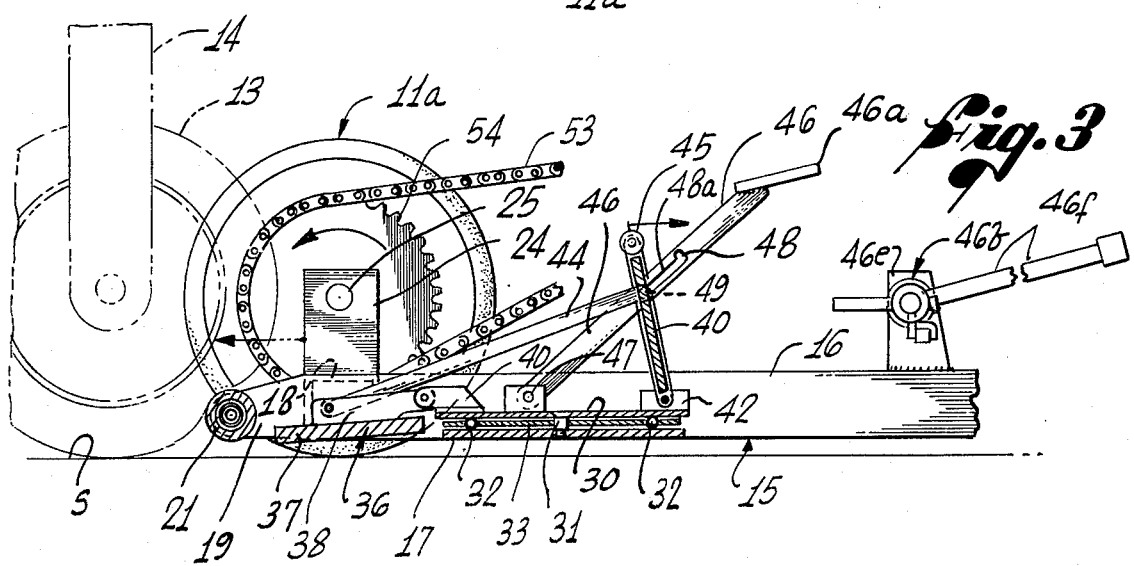
FIG. 3 is a longitudinal medial sectional view of the truck of FIG. 2, showing the parts in the position of FIG. 2, and showing the truck in the position of FIG. 2, in the initial stage of being thrust under the nose wheel of the airplane.

The truck 11 has front wheels 11a, a rear caster wheel 11b, a drop frame 15 comprised of two parallel and approximately horizontal longitudinal members 16, preferably of box section, a transverse horizontal frame plate 17 extending between and welded to the lower edges of the longitudinal members 16, spaced somewhat rearwardly from the front ends of the latter, two front end stub frame members 18, of box section, extending inwardly for a distance as shown from the front extremities of the longitudinal members 16, and terminating in forwardly and somewhat downwardly reaching bracket arms 19 supporting between their front ends an axle shaft 20 on which is rotatably mounted, by means of an anti-friction bearing (not shown), a cylindrical nose roller 21, positioned with a suitable clearance from the runway surface S (FIG. 3). The rearward ends of the longitudinal members 16 are joined by a rearward transverse frame member 23. The front ends of the longitudinal members have welded thereto the lower ends of hanger arms 24, whose upper ends bear the axles 25 for the front wheels 11a of the truck.

A turntable 30 in the form of a flat plate is mounted for rotation on a pivot pin 31 set into the aforementioned horizontal frame plate 17, and is rotatable on bearing balls 32 set into a ball carrier plate 33 mounted between plates 30 and 17 as shown in FIG. 3.

Figure 2:
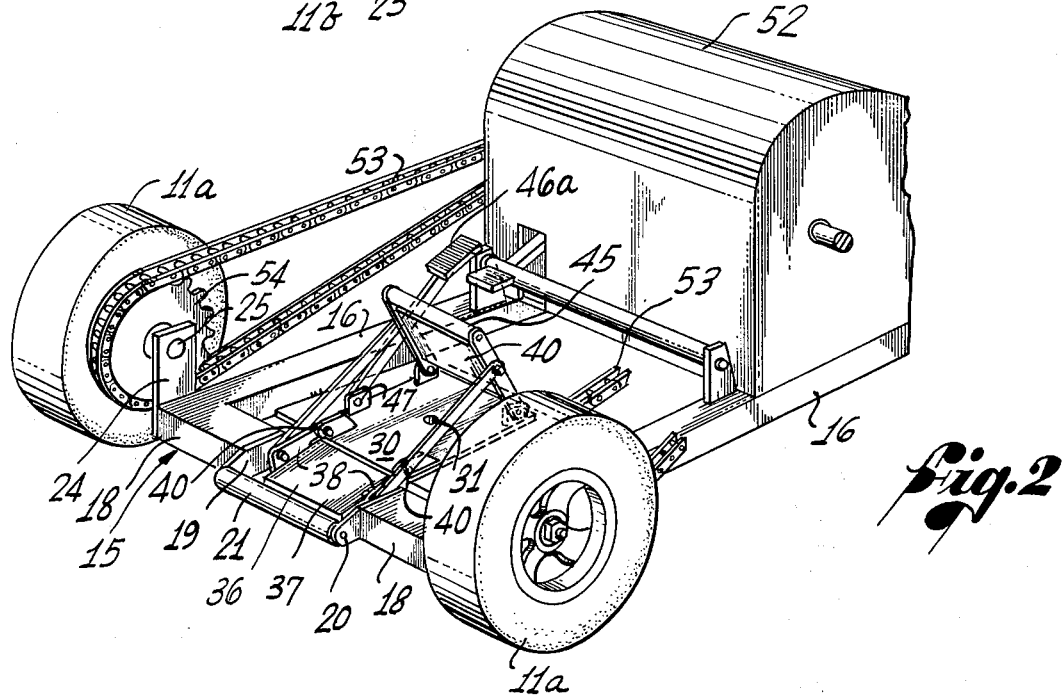
FIG. 2 is a perspective view of the transport truck, looking towards the front end thereof, the truck being in position to be thrust under the front nose wheel of the airplane.

A gate 36 comprised of a plate 37, and edge flanges or arms 38 turned at right angles thereto, is pivotally mounted on lugs 40 on the normally front located edge portion of the turntable 30. These lugs pivotally mount the gate 37 from below on a horizontal axis, just above the turntable, so that the gate is movable between an initial downward position, with its front edge just in back of the aforementioned nose cylinder 21, and hence in a position to function as a platform or bridge for receiving the nose wheel 13 of the airplane as the nose cylinder 21 is thrust under said wheel 13. The downwardly swung gate and turntable pass successively under the nose wheel as the truck continues to advance. As the turntable is approaching a centered position under the turntable, the nose wheel is engaged by a forwardly tilted rearward confinement gate 40, pivoted adjacent to its lower edge on the normally rearward edge of the turntable 30 on a horizontal transverse pivot axis by means of pivot lugs 42 secured to the turntable. The pivot axes of the two gates are thus horizontal, substantially level with one another, and extend transversely of the turntable in parallelism with one another. Side links 44 connect the gates, and when the front gate 36 is down (FIGS. 2 and 3), rearward gate 40 leans slightly forwardly.

In the operation described immediately above, a cylindrical roller 45 mounted atop the forwardly tilted rearward gate 40 collides with the nose wheel 11a, the gate 40, as well as the gate 36 moving up and rearwardly to the position of FIG. 5.

A latch arm 46 pivotally mounted, as at 47, on one side edge of the turntable, has a bayonet slot 48, whose lateral extent 48a extends upwards, and said slot receives the shank of the pivot pin 49 that connects the rearward end of one of the links 44 to the rearward gate 40. When the gate 40 has swung rearwardly its full intended distance, as in FIG. 5, the pivot pin 49 and lateral slot portion 48a register, and the arm 46 drops slightly as the pin 49 enters slot portion 48a. The linkage made up of the two gates, the links 44, and the turntable, thus automatically locks up (FIG. 6). Subsequent unlocking of the linkage, prior to unloading the nose wheel, is accomplished by upward engagement of a plate 46a on the rearward end of the pivoted arm 46, as by the front arm of an unlatching lever 46b on a tubular nub 46c pivoted on a shaft 46d carried by mounting standards 46e. The aft arm 46f of the lever 46b is moved downward to accomplish this action. The last-mentioned arm 46f, in the case illustrated, projects through suitable slots in the engine bonnet and is engageable from the rear of the latter. It will be fully exposed when an engine bonnet is not provided.

With the pen linkage locked up, the nose wheel 13 bears on the turntable, trapped between the front and rearward gates 36 and 40, inside the side links 44.

With the nose wheel 13 thus trapped on the turntable, the transport truck 11 can be driven by its engine (not shown) located inside engine bonnet 52, through drive chain 53 and sprocket gears 54 to the track wheels 11a.

The truck is manually guided through upwardly and rearwardly extending side rods 56, mounted onto the truck frame at their lower ends, and a transverse handle bar 57. In case there is no engine, manual power is applied through this handle bar.

In service, the carriage wheels of the airplane are preferably blocked from the back, as with triangular blocks (not shown). In some cases, only the nose wheel need be blocked, and with the lighter airplanes, the inertia of the airplane will serve to hold it in place during elevation onto the truck if the forward thrust is sufficient. The truck is thrust forward, with its front cylindrical roller 21 entering into the angle between the wheel 13 and the ground surface, but not engaging the ground surface. If the truck is engine powered, engine power is used in making this forward thrust. FIG. 3 shows the roller having just engaged in this angle between the wheel 13 and the ground, and having somewhat indented itself into the tire on the wheel 13. Moving forward, the truck thus forces the roller 21 ahead somewhat into the pneumatic tire of the wheel, and then, gradually lifting the nose wheel, to go on through the vertical center line of the nose wheel.

In the course of this performance, the roller 21, being off the ground, freely rotates on its axis, and at the same time, gradually elevates the nose wheel. As the nose wheel goes off the ground, its load is transferred to the roller 21, and in turn to the truck wheels. These wheels thus gain good traction with the ground surface, and crawl forward under the nose wheel until the latter is centered over the turntable. The lowered front gate in reaching this position moves forwardly under the nose wheel, in tractive engagement therewith.

The transport truck can maneuver the airplane about, in either direction along its longitudinal center line, or in view of the turntable mounting, can be turned to one side or the other, and thus steer the airplane on a circular arc. This can be done under either manual or engine power.

To effect a dismount of the aircraft nose wheel from the truck, the previously mentioned release lever is actuated, causing arm 46 to elevate and the pivot pin 49 to return to the longitudinal portion of the bayonet slot 48, whereupon the wheel trap or pen linkage collapses, dropping the gate 36, and the truck is then simply pulled out from under the nose wheel.

What is claimed is:

1. A truck for elevating and trapping the pneumatically tired nose carriage wheel of an airplane, and for subsequently transporting the airplane over the ground surface by said wheel, comprising:
   a truck frame;
   two front wheels and at least one rear wheel for said frame;
   a horizontal pick-up roller mounted for rotation on a transverse axis on the front end of said frame, with the underside thereof spaced above the ground surface, said roller being engageable upwardly and forwardly with the tire of the nose wheel of the airplane in front of the point of engagement of the nose wheel with the ground surface;
   turntable mounted for rotation on a vertical axis on said frame, said turntable being spaced generally rearwardly of the axis of said front wheels, and being spaced above the ground surface at a level generally coordinated with the height of the topside of said pick-up roller above ground surface;
   forward and rearward gates pivotally mounted on the normally front and rearward sides of said turntable on parallel, transverse, horizontal axes, said forward gate being pivotally movable between an initial forward, downwardly swung position, in which it acts as a transport bridge for the nose wheel of the airplane between said pick-up roller and the normally front edge of said turntable, and an upward second position in which it forms a barrier behind the airplane nose wheel resting on the turntable, and said rearward gate being pivotally movable an initial forwardly rocked position over the rearward edge portion of the turntable, and a rearwardly rocked second position in which it forms a barrier in front of the airplane nose wheel;
   link means having pivot connections to said gates to swing said gates between said initial and second positions in unison, said rearward gate being engageable against said nose wheel in the course of relative travel of said truck and nose wheel to move from said initial position to said second position; and releasable means for locking said gates in said second position.

2. The truck according to claim 1, including power means geared to the front wheels of the truck.

3. The truck according to claim 1, including an anti-friction roller on a horizontal axis mounted at the top of said rearward gate in a position for making the engagement against said nose wheel.

4. The truck according to claim 1, wherein said releasable means comprises a lock arm pivotally connected at a lower end thereof to said turntable, on an axis parallel to the gate axes, and having a longitudinal bayonet slot which receives a pivot pin set into said rearward gate to constitute one of said pivot connections to said rearward gate, said bayonet slot having an upwardly extending lateral slot portion for locking engagement with said pivot pin.

5. The truck according to claim 4, including also a lever engageable with an upper extremity of said lock arm to elevate said arm to a position wherein said lateral slot portion of said bayonet clears said pivot pin.

6. A truck for elevating and trapping the pneumatically tired nose carriage wheel of an airplane, and for subsequently transporting the airplane over the ground surface by said wheel, comprising:

a truck frame;

two front wheels and at least one rear wheel for said frame;

a horizontal pick-up roller mounted for rotation on a transverse axis on the front end of the said frame, with the underside thereof spaced above the ground surface, said roller being engageable upwardly and forwardly with the tire of the nose wheel of the airplane in front of the point of engagement of the nose wheel with the ground surface;

a turntable mounted for rotation on a vertical axis on said frame, said turntable being spaced generally rearwardly of the axis of said front wheels, and being spaced above the ground surface at a level generally coordinated with the height of the topside of said pick-up roller above ground surface;

a gate pivotally mounted on the normally front side of said turntable on a horizontal axis transverse of said frame, said gate being pivotally movable between an initial forward downwardly swung position, in which it acts as a bridge between said pick-up roller and the normally front edge of the turntable, and an upwardly swung second position in which it forms a barrier behind the airplane nose wheel;

a rearward barrier for said wheel on the normally rearward side of the turntable; and means responsive to relative translation of said turntable and nose wheel into a centered position of the nose wheel on the turntable for elevating said barrier into said upwardly swung second position.

* * * * *